US006766160B1

United States Patent
Lemiläinen et al.

(10) Patent No.: US 6,766,160 B1
(45) Date of Patent: Jul. 20, 2004

(54) APPARATUS, AND ASSOCIATED METHOD, FOR FACILITATING AUTHENTICATION OF COMMUNICATION STATIONS IN A MOBILE COMMUNICATION SYSTEM

(75) Inventors: Jussi Lemiläinen, Tampere (FI); Antti Kangas, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/546,582

(22) Filed: Apr. 11, 2000

(51) Int. Cl.[7] .................. H04M 1/66; H04M 1/68; H04M 3/16; H04B 5/00

(52) U.S. Cl. .................. 455/411; 455/410; 455/466; 455/41.2; 455/41.3

(58) Field of Search .................. 455/41, 466, 410, 455/411, 433, 41.2, 41.3

(56) References Cited

U.S. PATENT DOCUMENTS

| 5,603,084 A | 2/1997 | Henry, Jr. et al. |
| 5,742,905 A | 4/1998 | Pepe et al. |
| 5,822,310 A | 10/1998 | Chennakeshu et al. |
| 5,857,016 A | 1/1999 | Jedlicka |
| 5,978,672 A | 11/1999 | Hartmaier et al. |
| 6,151,309 A | 11/2000 | Busuioc et al. |
| 6,255,800 B1 * | 7/2001 | Bork .................. 320/115 |
| 2002/0160806 A1 * | 10/2002 | Arazi et al. .................. 455/555 |

FOREIGN PATENT DOCUMENTS

| WO | WO 97/14258 | 4/1997 |
| WO | WO 97/34429 | 9/1997 |
| WO | WO 99/29126 | 6/1999 |
| WO | WO 00/01187 | 1/2000 |

OTHER PUBLICATIONS

"Specification of the Bluetooth System"; XP002175286; Specification vol. 1; v1.0 B; Dec. 1, 1999; pp. 1, 149–178.

* cited by examiner

Primary Examiner—Vivian Chin
Assistant Examiner—Eugene Yun

(57) ABSTRACT

Apparatus, and an associated method, facilitates authentication of at least a portion of a Bluetooth-based, or other, communication system by a mobile terminal. A manner is provided by which to provide to the network portion of the communication system unique identifiers which identify the Bluetooth transceiver circuitry of the mobile terminal. Once provided to the network portion, authentication procedures by which to authenticate the network portion are carried out.

15 Claims, 3 Drawing Sheets

APPARATUS, AND ASSOCIATED METHOD, FOR FACILITATING AUTHENTICATION OF COMMUNICATION STATIONS IN A MOBILE COMMUNICATION SYSTEM

The present invention relates generally to a manner by which to effectuate authentication of communication stations operable in a communication system, such as a Bluetooth-based communication system. More particularly, the present invention relates to apparatus, and an associated method, by which to facilitate authentication of at least a portion of the network infrastructure of the Bluetooth-based, or other, communication system by a mobile terminal. Operation of an embodiment of the present invention provides for effectuation of authentication without compromising the confidentiality of identifiers used in the authentication procedures.

BACKGROUND OF THE INVENTION

Advancements in communication technologies have permitted the development, and popularization, of new types of communication systems. Multi-user, wireless communication systems are exemplary of communication systems made possible as result of such advancements. A cellular communication system is a multi-user, wireless communication system capable of concurrent use by large numbers of users.

In a cellular communication system, as well as other types of radio communication systems, a communication channel formed between a sending station and a receiving station is formed of a radio channel defined upon a portion of the electromagnetic spectrum. A wireline connection is not required to be formed between the sending and receiving stations. Thereby, a radio communication system is inherently of increased communication mobility, relative to conventional wireline communication systems.

Digital communication techniques have been implemented in radio, as well as other, communication systems. Digital communication techniques generally permit the communication system in which the techniques are implemented to achieve greater communication capacity contrasted to conventional, analog communication techniques.

Information which is to be communicated in a communication system which utilizes digital communication techniques, typically, digitizes the information to form digital bits. The digital bits are typically formatted according to a formatting scheme. Groups of the digital bits, for instance, are positioned to form a packet, and, one or more packets of data are sometimes together defined to form a frame of data.

Because packets, or frames, of data can be communicated at discrete intervals, rather than continuously, a frequency band need not be dedicated solely for the communication of data between one communication pair. Instead, the frequency band can be shared amongst a plurality of different communication pairs. The ability to share the frequency band amongst the more than one communication pair permits a multiple increase in the communication capacity of the system.

Packet-data communications are effectuated, for instance, in conventional LANs (Local Area Networks). Wireless networks, operable in manners analogous to wired LANs, referred to as WLANs (Wireless Local Area Networks) have also been developed and are utilized to communicate data over a radio link. Some of such packet communication systems are able to provide for voice, as well as nonvoice, communications.

A WIO (Wireless Intranet Office) is exemplary of a packet radio communication system which is intended to provide voice, and other real time, communications. Voice communications by way of a WIO provides the advantage of use of a wireless communication system in a cost-effective manner. Voice, as well as other data, can be communicated between mobile terminals operable in such a system. Various aspects of conventional cellular, or microcellular, communication systems are conventionally utilized in a WIO system.

For instance, authentication procedures are carried out to ensure that the mobile station and the network portion of the WIO system are authentic. Subsequent to authentication, communications are permitted between the mobile station and network portion of the system.

At least one proposal has been set forth by which to provide a dual-mode mobile terminal, operable in both a conventional cellular, such as a GSM (Global System for Mobile communications) communication system, and also a WIO network. In particular, one WIO network is proposed to utilize Bluetooth radio technology in which Bluetooth signals form the radio access medium between the mobile terminal and corresponding infrastructure of the WIO network. In order to create a secure radio link, the device is to be operable pursuant to a communication session, i.e., the Bluetooth mobile terminal of the dual-mode mobile terminal and the Bluetooth network infrastructure of the WIO system, must authenticate each other. Once authenticated, encryption keys can be used by the devices to encrypt signals to be communicated therebetween.

The Bluetooth standard, for instance, sets forth an authentication procedure by which Bluetooth devices authenticate each other and provides for execution of a procedure referred to as pairing. In a pairing procedure, a secret, link key is created, based upon secret identifiers, referred to as PIN codes, of a Bluetooth device. Once pairing has been completed, a link key to be used subsequently between the devices is created.

Such a pairing process, however, requires user interaction and therefore is not automated.

An automated procedure by which authentication can be performed would be advantageous.

It is in light of this background information related to radio communication systems that the significant improvements of the present invention have evolved.

SUMMARY OF THE INVENTION

The present invention, accordingly, advantageously provides apparatus, and associated methodology, by which to facilitate authentication of at least a portion of the network of a Bluetooth-based, or other, communication system by a mobile terminal. Authentication is performed automatically, without requiring user interaction, and maintains the confidentiality of the identifiers used in the authentication procedure.

In one aspect of the present invention, a manner is provided by which to facilitate authentication by a dual-mode, mobile terminal. In a first of the dual modes, the mobile terminal is operable to communicate in a WIO (Wireless Intranet Office) with a PBU (Personal Base Unit) forming a portion of the network infrastructure of the WIO. The PBU is coupled to be able to access a storage device located, for instance, at an ILR (Intranet Location Register), which also forms a portion of the network infrastructure of the WIO. The storage device located at the ILR stores identifiers identifying mobile terminals permitted to communicate by way of the WIO. In one implementation, the identifiers form PIN codes associated with respective ones of the mobile terminals. During authentication procedures, the PIN code associated with a mobile terminal requesting authentication is retrieved from the storage device of the ILR and utilized during the authentication procedures. By storing the identifier at the storage device of the ILR, the identifier is accessible, such as by way of a wireline connection formed between the ILR and the personal base unit when authentication procedures are to be performed. Once the identifier is retrieved from the storage device of the ILR, the value thereof is utilized in authentication procedures by which the mobile terminal authenticates the personal base unit.

In another aspect of the present invention, the dual-mode, mobile terminal is also operable in a cellular communication system, such as a GSM (Global System for Mobile communications) communication system. In one implementation, indications of the identifier stored at the storage device of the ILR are provided thereto during operation of the mobile terminal to communicate by way of the cellular communication system.

Namely, authentication procedures are first performed pursuant to operation of the mobile terminal in the cellular communication system and, thereafter, communications are effectuated therethrough, utilizing encryption, as appropriate. Pursuant to operation of the mobile terminal with the cellular communication system, indications of the identifier identifying the mobile terminal in the Bluetooth communication system, such as the PIN code, is provided to the network infrastructure of the cellular communication system. Once received at the network infrastructure of the cellular communication system, the indications of the identifier are routed to the storage device at the ILR.

Thereafter, when the mobile terminal is to be operated pursuant to the Bluetooth communication system, the identifier stored at the storage device is retrieved and thereafter used during authentication procedures by which the mobile terminal authenticates the personal base unit of the Bluetooth communication system. In an implementation in which the cellular communication system forms a GSM communication system which provides for SMS (Short Message Service) messaging, the indicator, such as the PIN code, is formatted into a SMS message. And, the SMS message is sent to the network infrastructure of the cellular communication system, routed to a SMS service center, and, thereafter, to the ILR at which the storage device is located.

In one implementation in which SMS messaging is utilized to communicate the indicator to the ILR, a service request is first sent by the mobile terminal to a service number of the wireless Intranet office. The IMSI and IMEI of the mobile terminal, both defined in the GSM communication system, are used as parameters in such service request message. The message is routed to a service center of the WIO. Once detected at the WIO service center, the identity of the requesting device is checked, based upon the values of the IMSI and IMEI contained in the message. If a determination is made that service with the mobile terminal would be permitted, the service center of the WIO returns a message to the mobile terminal, also in the form of a SMS message, with the network identifier of the WIO, as well as other relevant parameters. Thereafter, the mobile terminal generates a SMS message containing the identifier, such as the PIN code, associated with the mobile terminal. The indications of the identifier contained in the SMS message are later utilizable in authentication procedures by which the mobile terminal authenticates one or more personal base units of the WIO.

In another aspect of the present invention, public key authentication and encryption is utilized by which the mobile terminal authenticates the personal base unit of the WIO. A non-secure link is establishable between the mobile terminal and the personal base unit of the Bluetooth communication system. A public key is thereafter provided by the personal base unit of the Bluetooth communication system to the mobile terminal. The public key is used by the mobile terminal to encrypt the identifier of the mobile terminal, such as the PIN code identifying the mobile terminal, and, once encrypted, the identifier is provided to the personal base unit. Once provided to the personal base unit, authentication procedures are carried out between the mobile terminal and the personal base unit, thereby to authenticate the personal base unit to the mobile terminal.

In these and other aspects, therefore, apparatus, and an associated method, is provided for facilitating authentication in a mobile communication system. The mobile communication system has a mobile terminal operable to communicate pursuant to a first radio communication system and to communicate pursuant to a second radio communication system. Authentication of the second radio communication system is facilitated. A storage element is coupled to the second radio communication system. The storage element stores indications of a secured identifier which identifies the mobile terminal in the second radio communication system. The indications of the secured identifier are accessible by the second radio communication system to be used in authentication procedures by the mobile terminal to authenticate the second radio communication system.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
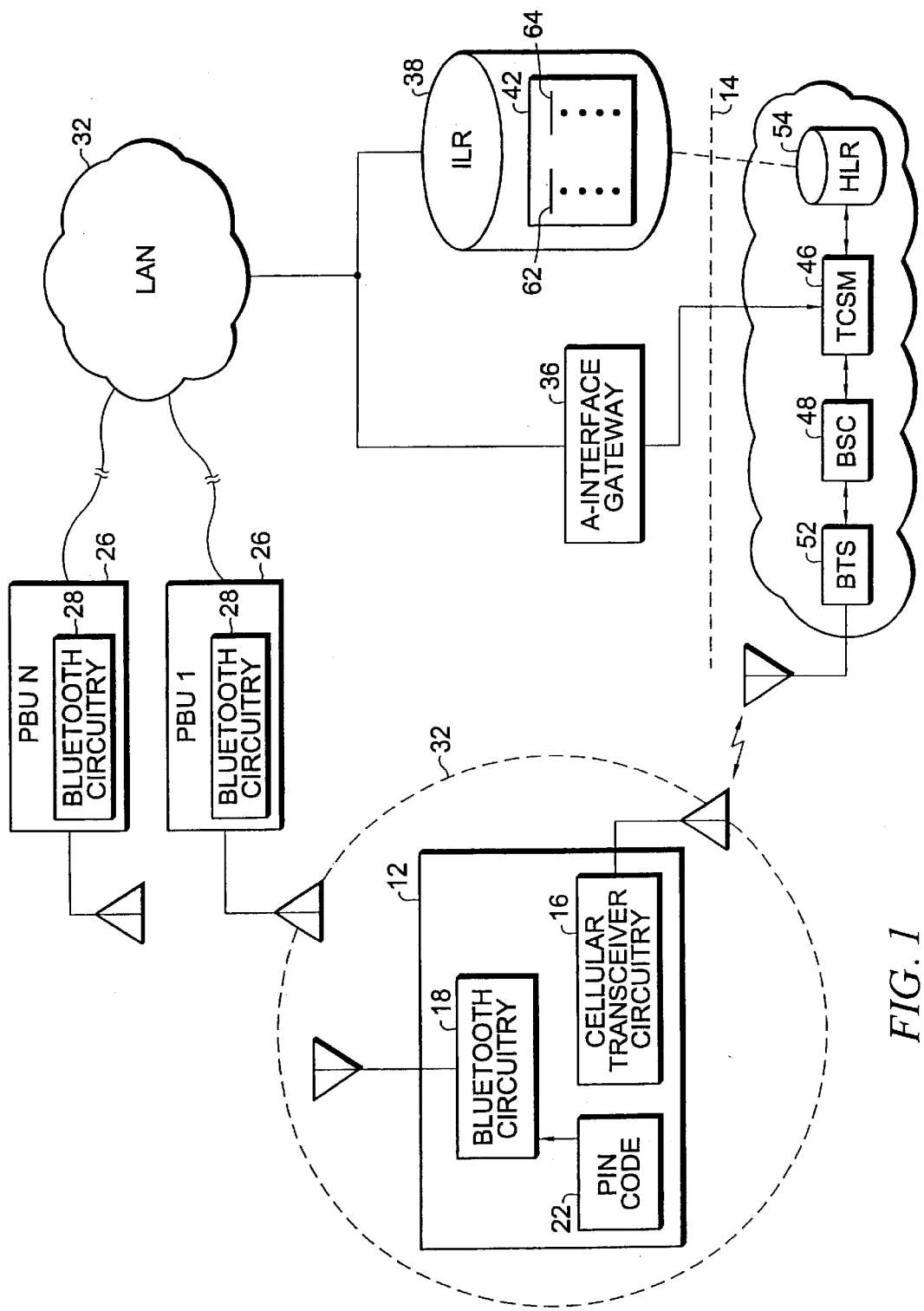
FIG. 1 illustrates a functional block diagram of a radio communication system in which an embodiment of the present invention is operable.

Referring first to FIG. 1, a radio communication system, shown generally at 10, is operable to provide for radio communications with a multi-node mobile terminal 12. In the exemplary implementation, the system 10 includes a WIO (Wireless Intranet Office) portion, formed of the elements positioned above the line 14, shown in dash, and, also, a cellular portion, formed of the elements shown beneath the line 14 in the Figure. In the exemplary implementation, the WIO portion is a Bluetooth-based system operable to comply with the standard specifications set forth in a relevant Bluetooth standard specification. And, in the exemplary implementation, the cellular portion is formed of a GSM (Global System for Mobile communications) network. In other implementations, the radio communication system 10 is formed of portions operable pursuant to other communication system standards. Operation of various embodiments of the present invention are also analogously operable in such other communication systems.

The mobile terminal 12 here forms a dual-mode mobile terminal operable in each of the WIO and cellular portions of the communication system. More generally, the mobile terminal 12 forms a multi-mode mobile terminal; in other implementations, the mobile terminal 12 is further operable pursuant to additional WIO networks in addition to the single WIO network shown in the Figure. And, the mobile terminal 12, in other such implementations, is also operable to communicate by way of more than one cellular network.

Accordingly, the mobile terminal 12 includes cellular transceiver circuitry 16 and WIO network transceiver circuitry, here Bluetooth transceiver circuitry 18, thereby to permit communications with the mobile terminal by way of either portion of the radio communication system.

A PIN code 22 is associated with the Bluetooth transceiver circuitry 18. The PIN code uniquely identifies the Bluetooth transceiver circuitry. In an implementation in which the mobile terminal 12 includes additional Bluetooth transceiver circuitry elements, additional PIN codes are associated with each additional Bluetooth transceiver circuitry element.

The WIO portion of the system 10 includes a plurality of PBUs 26, each of which includes Bluetooth transceiver circuitry 28. The Bluetooth transceiver circuitry 28 associated with each of the PBUs permits Bluetooth-based communications with the mobile terminal 12 when the mobile terminal 12 is positioned in areas, here referred to as cells 32, defining the coverage areas of the transceiver circuitry 28. Each of the PBUs 26, and the Bluetooth transceiver circuitry 28 embodied therein, is coupled to a packet data network, here a Local Area Network (LAN) 34. The LAN 34 is further coupled to an A-interface Gate Way (AGW) 36 and to an Intranet Location Register (ILR) 38. The gateway 36 forms a gateway between the portions of the radio communication system and is here operable to perform the functions of a traffic router and data converter between the two portions. The ILR 38 operates to form a data base which stores subscriber data associated with the mobile terminal.

Pursuant to an embodiment of the present invention, the ILR 38 includes a storage device 42 operable to store information to be used during authentication procedures prior to the effectuation of communication with the mobile terminal.

The cellular portion of the communication system includes a Trans Coder Sub-Multiplexer (TCSM) 46 coupled to the gateway 36. The sub-multiplexer is operable to perform transcoding operations. The cellular portion of the communication system is further shown to include a Base Station Control (BSC) 48, and a Base Transceiver Station (BTS) 52. The BTS 52 is operable in conventional manner to transceive communication signals with the mobile terminal 12, and the controller 48 is operable, also in conventional manner, to control operation of the base transceiver station 52. The cellular communication portion of the communication system is further shown to include an HLR (Home Location Register) 54, also operable in conventional manner to maintain, amongst other things, subscription-related information pertaining to the mobile terminals operable in the cellular system portion of the communication system.

The storage device 42 embodied at the ILR 38 includes storage locations for the storage thereat of identifiers identifying the Bluetooth transceiver circuitry, such as the Bluetooth transceiver circuitry element 18 of the mobile terminal 12, operable in the Bluetooth-network portion of the radio communication system. Here, the storage device stores data permitting a mapping between the IMSI value of the mobile terminal, defined in the GSM communication system, and a value of BD_ADDR, defined in the Bluetooth communication system. Thereby, the mobile terminal 12 is identified in terms of a GSM identifier together with the identifier of the Bluetooth transceiver circuitry, also forming a portion of the mobile terminal. And, more particularly, the IMEI of the mobile station is stored at the storage device 42, here indicated in the column 62, and the Bluetooth unit description of the Bluetooth transceiver circuitry contained in the associated mobile terminal is indicated to be stored in the column 64. The Bluetooth unit description is, for instance, the BD_ADDR of the Bluetooth transceiver circuitry. The BD_ADDR is a 48-bit code uniquely identifying the Bluetooth transceiver circuitry. The description may also be formed of the PIN code associated with the Bluetooth transceiver circuitry, and the link key, i.e., the unit key associated with the Bluetooth transceiver circuitry. The storage device, for instance, further stores subscription data associated with the mobile terminal.

The data stored at the storage device 42 is utilized during authentication procedures when the mobile terminal is to communicate by way of the Bluetooth network portion of the radio communication system. That is to say, when communication is to be effectuated by way of the Bluetooth network portion of the communication system, the Bluetooth transceiver circuitry 28 of an appropriate PBU 26 and the corresponding Bluetooth transceiver circuitry 18 of the mobile terminal 12 form a radio link and communicate therebetween. Prior to effectuation of communications therebetween, authentication procedures are performed, at least by the mobile terminal, to authenticate the PBU 26, viz., the Bluetooth transceiver circuitry 28 associated therewith.

When authentication is requested, the storage device 42 of the ILR 38 is accessed, by way of the LAN 34. The identifiers identifying the Bluetooth transceiver circuitry 18 of the mobile terminal are retrieved from the storage device 42 and provided to the Bluetooth transceiver circuitry 28 of the appropriate PBU. Such values are used, as shall be described below, in the authentication procedures. Once authentication is completed, Bluetooth-based communications between the mobile terminal and the Bluetooth portion of the communication system is permitted.

Figure 2:
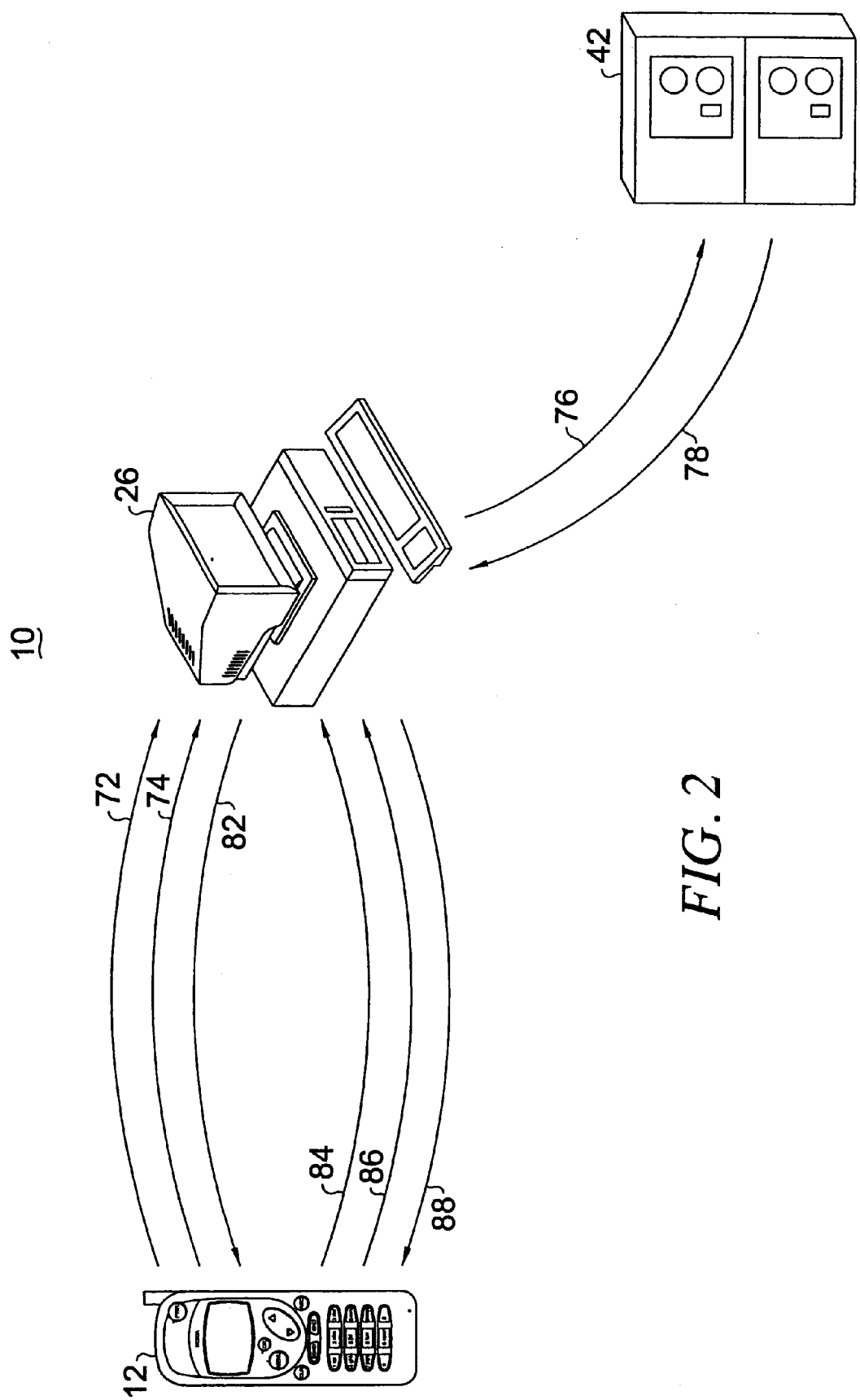
FIG. 2 illustrates a partial functional-block, diagram of portions of the communication system shown in FIG. 1 together with a sequence of signals generated during operation of an embodiment of the present invention.

FIG. 2 illustrates portions of the radio communication system 10 shown in FIG. 1. Namely, FIG. 2 illustrates the mobile terminal 12, the PBU 26, and the storage device 42 forming a portion of the ILR 38. Signaling between the mobile terminal 12 and the PBU 26 by way of a Bluetooth radio link is further illustrated in the Figure as is also signaling between the PBU 26 and the storage device 42. Operation of an embodiment of the present invention by which to facilitate authentication procedures is described as follows. It should be noted that, while reference shall be made to the mobile terminal and PBU 26, signaling actually is effectuated between the Bluetooth transceiver circuitry 18 and 28 of the respective devices.

When the mobile terminal enters into an area encompassed by the Bluetooth portion of the communication system and the mobile terminal is to commence a communication session, a signal is transmitted by the mobile terminal to the PBU. Namely, a LMP (Link Manager Protocol) message, LMP_In_RAND signal is sent by the mobile terminal to the PBU. Such a signal is defined in an existing Bluetooth standard. The message is indicated by the segment 72 shown in the Figure. Then, a reply message the mobile terminal sends an additional message, a LMP__accepted message, indicated by the segment 74, is returned by the PBU to the mobile terminal. The PBU (here the claimant) may deny pairing. Here, to continue the pairing procedure, the PBU creates an init key based upon the data of the segment 72.

Then, mutual normal authentication based upon the init keys, created at both sides, is performed. The PBU inquires of the storage device 42 of a Bluetooth identifier which identifies the Bluetooth transceiver circuitry of the mobile terminal from which the message 72 originated. The identifier, here PIN__INFO, associated with the mobile terminal is accessed and indications thereof are returned to the PBU. Here, the inquiry message is indicated by the segment 76, and the response thereto is indicated by the segment 78. Both storage device 42 and the link on which the messages 76 and 78 are communicated are secured, thereby preventing unauthorized access to the information stored at, and retrieved from, the storage device. Once returned to the PBU, such information is utilized in subsequent authentication procedures.

Then, the mobile terminal (here, the verifier) sends an authentication request to the PBU. First, here indicated by the segment 82, a LMP__au__rand message is sent by the mobile terminal over the Bluetooth radio link to the PBU. The LMP__au__rand message is based on the init key of the mobile terminal.

The PBU, in turn, responds with a message, indicated by the segment 84, a LMP__sres message. Then, LMP__au__rand exchanges are performed, indicated by the segment 86. The values are based upon the init key of the PBU. Then, and as indicated by the segment 88, a LMP__sres message is sent by the mobile terminal to the PBU. The PIN code of the PBU is fixed, e.g., for the entire network. This facilitates determination at the mobile terminal of whether reception at the mobile terminal of a value of a PIN code is sent by a valid PBU.

If both of the authentications are successful, i.e., if the mobile terminal knows the fixed PIN code of the PBU and the PBU knows the PIN code of the mobile terminal (fetched from the data base), then a link key can be created between the mobile terminal and the PBU. The link key that is used in the exemplary implementation is the unit key of the Bluetooth transceiver of the mobile terminal. LMP__unit__key messages, here represented by the segments 92 and 94, are then exchanged between the mobile terminal and the PBU.

In one implementation, the identifiers, such as the PIN codes associated with the Bluetooth transceiver circuitry 18, are stored in the storage device 42 pursuant to a subscription by a user of the mobile terminal to communicate in the Bluetooth network to which the storage device is coupled.

Figure 3:
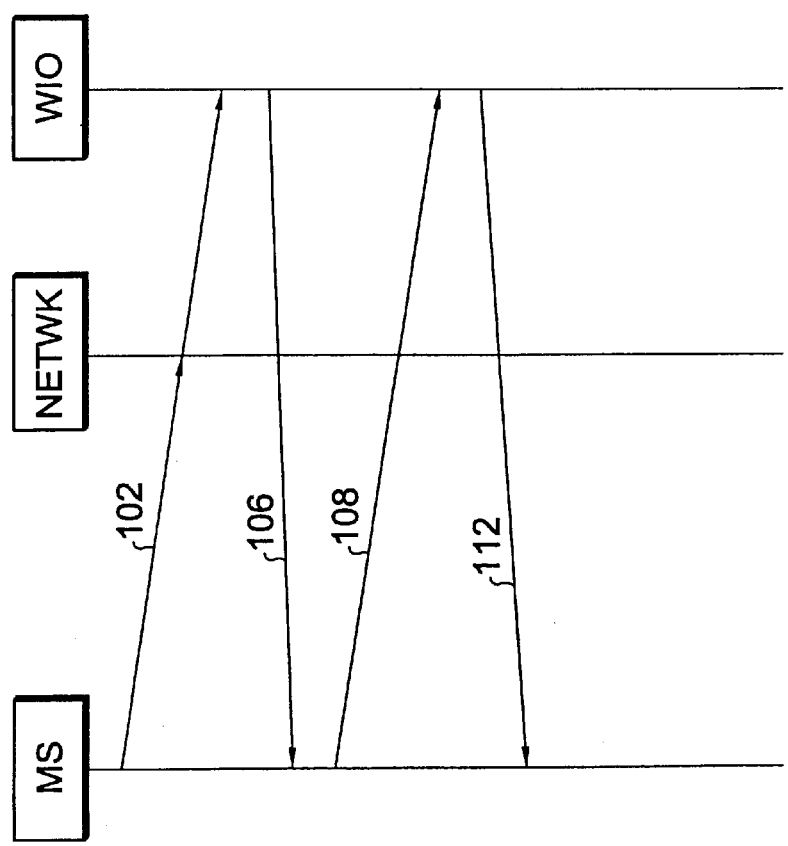
FIG. 3 illustrates a message sequence diagram listing the sequence of messaging generated during operation of an embodiment of the present invention.

FIG. 3 illustrates another manner by which the identifying information is stored at the storage device. In the implementation shown in FIG. 3, advantage is taken of the dual-mode nature of the mobile terminal and the authentication procedures carried out in the cellular communication system prior to which communications are permitted in the cellular system. Encryption keys are also exchanged between the mobile terminal and the network portion of the cellular communication system as a result of the authentication procedures, and, thereby, the communications between the mobile terminal and the network infrastructure of the cellular communication system are thereafter ensured to be secured.

When communications by way of the Bluetooth network are to be effectuated, the mobile terminal 12 first sends a SMS message, indicated by the segment 102, to a service center, here indicated at 104, associated with the Bluetooth, WIO network. The SMS message is routed, in conventional fashion, through the network infrastructure, such as by way of a SMS service center coupled to the infrastructure, and then on to the WIO service center. The SMS message includes values indicative of the IMSI and IMEI of the mobile terminal. The WIO service center 104, upon detection of the message, checks for the identity of the requesting mobile terminal, the method of which is derived from conventional GSM roaming concepts.

If a determination is made at the WIO service center that service can be admitted, a SMS message, indicated by the segment 106, is returned to the mobile terminal 12. The message 106 includes an indication of the network identifier of the Bluetooth network, the LAC (Location Area Code) thereof, and other appropriate parameters. The mobile terminal is then able to check with its own network for the validity of the service center reply parameters contained in the message 106. If a determination of network validity is made and is in the affirmative, the mobile terminal sends another SMS message, here indicated by the segment 108, to the WIO service center 104. The message 108 includes the identifier, such as the Bluetooth PIN code associated with the Bluetooth transceiver circuitry of the mobile terminal. When detected at the WIO service center, such identifier is stored at the storage device 42 thereof, and a SMS message, here indicated by the segment 112, is returned to the mobile terminal confirming the registration of the mobile terminal for service by way of the Bluetooth network. Thereafter, authentication procedures, such as described with respect to FIG. 2, are performed.

Figure 4:
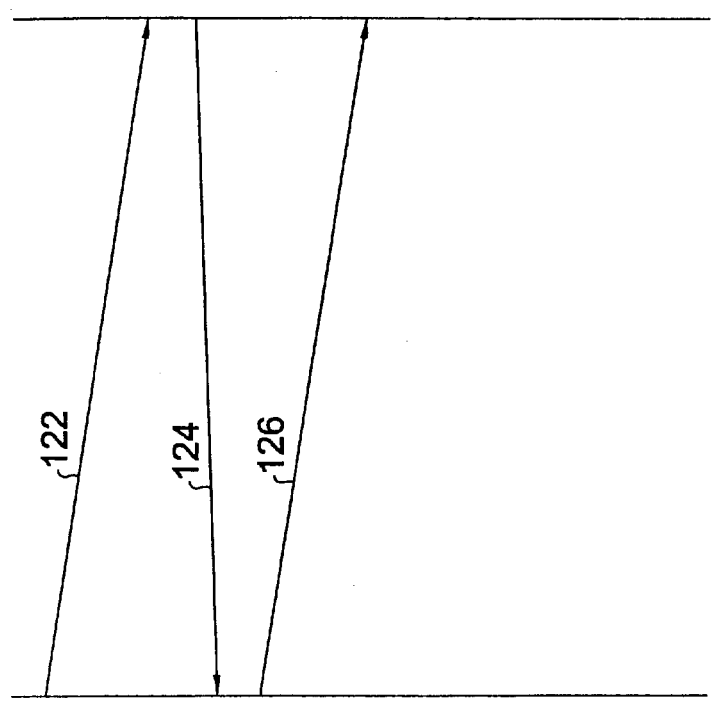
FIG. 4 illustrates a message sequence diagram listing the sequencing of messages generated during another embodiment of the present invention.

FIG. 4 illustrates an alternate manner by which the identifier is provided to the Bluetooth transceiver circuitry of the PBU 26 of the Bluetooth network portion of the communication system. In this embodiment, the access procedure is based upon public key authentication and encryption.

The storage device, in this implementation, need not be located at, e.g., the ILR of the Bluetooth network portion. Rather, each PBU 26 may include a storage device at which the identifier is stored and used pursuant to authentication procedures.

When the mobile terminal 12 enters a cell 18 associated with the PBU 26, a non-secure link, indicated by the segment 122, is formed between the PBU and the mobile terminal by way of a Bluetooth radio link. Then, and as indicated by the segment 124, a public key associated with the PBU is sent, by way of the Bluetooth radio link, to the mobile terminal. The public key, in one implementation, is transmitted together with an announcement of a Bluetooth speech service, such as a WIO service advertisement message.

Upon receipt of the public key, the mobile terminal encrypts the identifier associated with the Bluetooth transceiver circuitry thereof and sends the identifier, once encrypted into encrypted form, to the PBU in a Bluetooth message, indicated by the segment 126. Thereafter, conventional authentication procedures can be performed.

Thereby, a manner is provided by which to provide indications of an identifier which identifies uniquely the Bluetooth transceiver circuitry of a mobile terminal to the network infrastructure of the Bluetooth network portion of the radio communication system. The identifier is provided to the network infrastructure of the Bluetooth network portion in a manner which assures that the identifier is not accessible to others than those authorized. And, thereby, the mobile terminal is able to authenticate the Bluetooth network portion of the communication system.

The preferred descriptions are of preferred examples for implementing the invention, and the scope of the invention should not necessarily be limited by this description. The scope of the present invention is defined by the following claims.

We claim:

1. In a mobile communication system having a mobile terminal operable to communicate pursuant to a first radio communication system and also to communicate pursuant to a Bluetooth-based communication system having a Bluetooth network including at least one Bluetooth personal base unit, an improvement of apparatus for facilitating authentication of the Bluetooth-based communication system to communicate pursuant to the Bluetooth-based communication system, said apparatus comprising:

a storage element at least coupled to the Bluetooth personal base unit of the Bluetooth-based communication system, said storage element for storing indications of a secured-identifier identifying the mobile terminal in the Bluetooth-based communication system, the indications of the secured identifier accessible pursuant to authentication procedures by which the mobile terminal and Bluetooth personal base unit are authenticated wherein the secured identifier to be stored at said storage element is provided thereto by way of the first radio communication system.

2. The apparatus of claim 1 wherein the Bluetooth-based communication system comprises an ILR (Intranet Location Register), and wherein said storage element is embodied at the ILR.

3. The apparatus of claim 2 wherein the Bluetooth-based system defines PIN codes associated with mobile terminals operable therein and wherein the secured-identifier, indications of which are stored at said storage element, comprises a PIN code associated with the mobile terminal.

4. The apparatus of claim 2 wherein the at least one Bluetooth personal base unit of the Bluetooth-based system comprises a first Bluetooth personal base unit and at least a second Bluetooth personal base unit, and wherein the authentication procedures using the secured identifier authenticates at least one of the first and at least second Bluetooth personal base units, respectively.

5. The apparatus of claim 2 wherein the first radio communication system comprises a cellular communication system and wherein said storage element, embodied at the ILR, is further coupled to the cellular communication system.

6. The apparatus of claim 2 wherein the cellular communication system includes network infrastructure, wherein the ILR at which said storage element is embodied is coupled to the network infrastructure and wherein the secured-identifier is provided to the network infrastructure of the cellular communication system by the mobile terminal, and then routed to the ILR to be stored at said storage element.

7. The apparatus of claim 6 wherein the cellular communication system provides for packet-data communications with the mobile terminal and wherein the secured-identifier, provided to the network infrastructure to be routed to the ILR at which said storage element is embodied, is provided to the network infrastructure by the mobile terminal as a packet-data message.

8. The apparatus of claim 7 wherein the cellular communication system comprises a GSM (Global System for Mobile communication) system providing for SMS (Short Message Service) service, and wherein the packet-data message provided by the mobile terminal to the network infrastructure comprises a SMS message.

9. The apparatus of claim 1 wherein the secured-identifier identifying the mobile terminal is sent, in encoded form, by the mobile terminal to the Bluetooth personal base unit.

10. The apparatus of claim 9 wherein the Bluetooth personal base unit provides the mobile terminal with an encryption key and wherein the secured-identifier sent in encoded form is encrypted into the encoded form with the encryption key.

11. In a method for communicating in a mobile communication system having a mobile terminal operable to communicate pursuant to a first radio communication system and to communicate pursuant to a Bluetooth-based communication system having a Bluetooth network including at least one Bluetooth personal base unit, an improvement of a method for facilitating authentication of the Bluetooth-based communication system to communicate pursuant to the Bluetooth-based communication system, said method comprising:

communicating indications of a secured-identifier by way of the first radio communication system;

storing the communicated indications of a secured-identifier identifying the mobile terminal in the Bluetooth-based communication system;

accessing the indications of the secured-identifier stored during said operation of storing when authentication of the mobile station and the Bluetooth-based personal base unit is to be performed; and using the indications of the secured-identifier to perform authentication of the mobile station and the Bluetooth-based personal base unit.

12. The method of claim 11 wherein the Bluetooth-based system further comprises an ILR (Intranet Location Register) and wherein said operation of storing is performed at the ILR.

13. The method of claim 12 wherein the at least one Bluetooth personal base unit comprises a first Bluetooth personal base unit and at least a second Bluetooth personal base unit and wherein the indications of the secured-identifier used during said operation of using are used to authenticate at least one of the first and the at least second Bluetooth base units.

14. The method of claim 12 wherein the first radio communication system comprises a cellular communication system which provides for packet communications and wherein the said operation of communicating comprises sending a packet-data message to the ILR.

15. The method of claim 14 wherein the cellular communication system comprises a GSM system providing for SMS communications and wherein the packet-data message sent during said operation of sending comprises a SMS message.

* * * * *